(12) United States Patent
Nyberg, II et al.

(10) Patent No.: US 8,448,441 B2
(45) Date of Patent: May 28, 2013

(54) FUEL NOZZLE ASSEMBLY FOR A GAS TURBINE ENGINE

(75) Inventors: Charles Richard Nyberg, II, Greenville, SC (US); William Kirk Hessler, Greer, SC (US)

(73) Assignee: General Electric Company, Schenectady, NY (US)

( * ) Notice: Subject to any disclaimer, the term of this patent is extended or adjusted under 35 U.S.C. 154(b) by 1327 days.

(21) Appl. No.: 11/828,447

(22) Filed: Jul. 26, 2007

(65) Prior Publication Data
US 2009/0223054 A1 Sep. 10, 2009

(51) Int. Cl.
*B05B 7/08* (2006.01)
*F02C 1/00* (2006.01)

(52) U.S. Cl.
USPC .......................................... 60/742; 239/416.5

(58) Field of Classification Search
USPC ......... 60/740, 742, 772, 739, 796; 239/416.1, 239/416.4, 416.5, 417.5, 429–431, 423
See application file for complete search history.

(56) References Cited

U.S. PATENT DOCUMENTS

| 2,935,848 | A | * | 5/1960 | Billman | 60/741 |
| 4,154,056 | A | * | 5/1979 | Emory | 60/796 |
| 4,157,012 | A | * | 6/1979 | DuBell | 60/39.465 |
| 4,160,526 | A | * | 7/1979 | Flanagan | 239/427 |
| 4,292,801 | A | | 10/1981 | Wilkes et al. | |
| 4,735,044 | A | * | 4/1988 | Richey et al. | 60/742 |
| 4,982,570 | A | | 1/1991 | Waslo et al. | |
| 5,259,184 | A | * | 11/1993 | Borkowicz et al. | 60/39.55 |
| 5,426,933 | A | * | 6/1995 | Maden et al. | 60/39.55 |
| 5,491,970 | A | * | 2/1996 | Davis et al. | 60/776 |
| 5,685,139 | A | | 11/1997 | Mick et al. | |
| 6,446,439 | B1 | | 9/2002 | Kraft et al. | |
| 7,104,069 | B2 | | 9/2006 | Martling et al. | |
| 7,134,287 | B2 | * | 11/2006 | Belsom et al. | 60/800 |
| 7,165,405 | B2 | | 1/2007 | Stuttaford et al. | |
| 7,677,472 | B2 | | 3/2010 | Hessler | |
| 7,854,120 | B2 | * | 12/2010 | Olver | 60/739 |
| 8,122,721 | B2 | | 2/2012 | Johnson et al. | |
| 2005/0005610 | A1 | | 1/2005 | Belsom et al. | |
| 2007/0130955 | A1 | | 6/2007 | Vandale et al. | |
| 2007/0131796 | A1 | | 6/2007 | Hessler | |
| 2007/0151255 | A1 | * | 7/2007 | Johnson et al. | 60/776 |

FOREIGN PATENT DOCUMENTS

CN 101004263 A 7/2007

OTHER PUBLICATIONS

State Intellectual Property Office, P.R. China with corresponding Patent Application No. 200810133791.X on Jan. 10, 2011.
CN Office Action issued Sep. 27, 2011 with unofficial English translation from corresponding CN Patent Application No. 200810133791.X.

* cited by examiner

*Primary Examiner* — Andrew Nguyen
(74) *Attorney, Agent, or Firm* — Armstrong Teasdale LLP

(57) ABSTRACT

A method of fabricating a fuel nozzle is provided. The method includes providing a unitary portion of material including a first end face, a second end face, and a body extending therebetween. A passageway is fabricated to extend from the first end face to the second end face along a centerline of the portion of material. The method further includes fabricating a plurality of concentrically-aligned channels within the first end face, and fabricating a plurality of inlets that extend through at least one of the second end face and an outer surface of the body to at least one of the passageway and one of the plurality of channels.

14 Claims, 3 Drawing Sheets

FUEL NOZZLE ASSEMBLY FOR A GAS TURBINE ENGINE

BACKGROUND OF THE INVENTION

This invention relates generally to combustion systems for use with gas turbine engines, and, more specifically, to fuel nozzles used with gas turbine engines.

At least some known fuel nozzle assemblies used with gas turbine engines are assembled from a plurality of components, which, when fully assembled, form a one-piece fuel nozzle assembly. Known multi-piece fuel nozzles include a body portion and a sleeve portion. Because many components are coupled together, to prevent fluids from undesirably leaking from the nozzle assembly, at least some known nozzle assemblies include a plurality of seals between the components coupled together. More specifically, at least some known fuel nozzle assemblies use body-to-sleeve seals, water lip seals, diffusion lip seals, and/or piston seals. Despite their intended effectiveness, each seal may still be a potential leak area when exposed to pressurized fluids slowing through the nozzle assemblies or when subjected to high temperatures in the combustion systems of the gas turbine engine. Moreover, fuel nozzle assemblies having many components generally require more time and costs to fabricate and assemble than assemblies within the gas turbine engine that include few components.

BRIEF DESCRIPTION OF THE INVENTION

In one aspect a method of fabricating a fuel nozzle is provided. The method includes providing a unitary portion of material including a first end face, a second end face, and a body extending therebetween. A passageway is fabricated to extend from the first end face to the second end face along a centerline of the portion of material. The method further includes fabricating a plurality of concentrically-aligned channels within the first end face, and fabricating a plurality of inlets that extend through at least one of the second end face and an outer surface of the body to at least one of the passageway and one of the plurality of channels.

In another aspect a secondary fuel nozzle assembly is provided. The secondary fuel nozzle assembly includes a nozzle portion having a central passageway and a plurality of passageways that are each concentrically-aligned with the central passageway, and a unitary head portion coupled to the nozzle portion. The head portion includes a plurality of inlets, wherein each of the plurality of inlets is in flow communication with at least one of the plurality of nozzle passageways.

In still another aspect a combustor assembly for use with a gas turbine engine is provided. The combustor assembly includes a combustion zone, a primary fuel nozzle assembly coupled within the combustion zone, and a secondary fuel nozzle assembly coupled within the combustion zone. The secondary fuel nozzle assembly includes a nozzle portion having a central passageway and a plurality of passageways that are substantially concentrically-aligned with the central passageway, and a unitary head portion coupled to the nozzle portion. The head portion includes a plurality of inlets, wherein each of the plurality of inlets is in flow communication with at least one of the plurality of nozzle passageways.

DETAILED DESCRIPTION OF THE INVENTION

Figure 1:
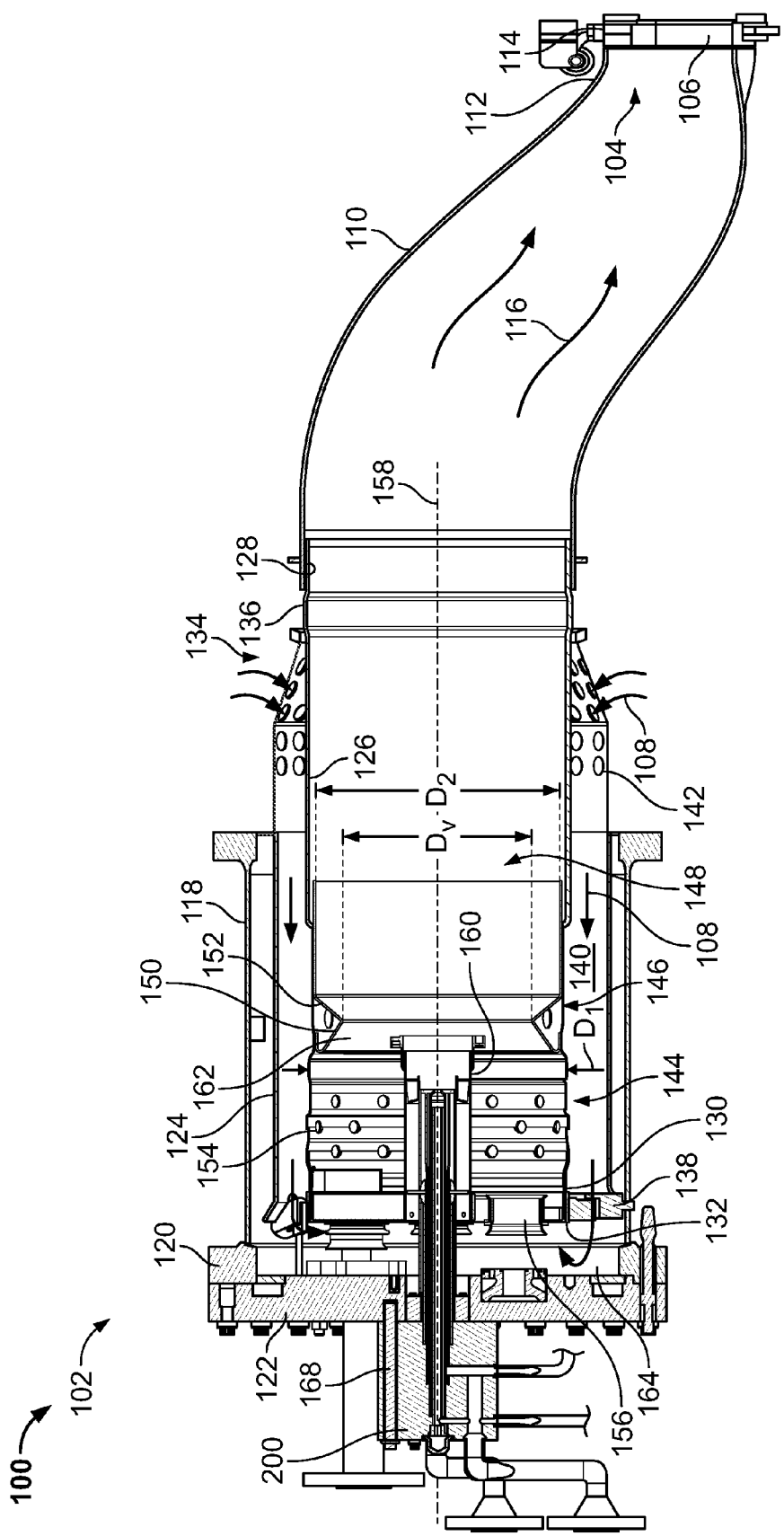
FIG. 1 is partial cross-sectional view of an exemplary gas turbine combustion system.

FIG. 1 is partial cross-sectional view of an exemplary gas turbine engine 100 that includes a fuel nozzle assembly 200. Gas turbine engine 100 includes a compressor (not shown), a combustor 102, and a turbine 104. Only a first stage nozzle 106 of turbine 104 is shown in FIG. 1. In the exemplary embodiment, the turbine is rotatably coupled to the compressor with rotors (not shown) that are coupled together via a single common shaft (not shown). The compressor pressurizes inlet air 108 prior to it being discharged to combustor 102 wherein it cools combustor 102 and provides air for the combustion process. More specifically, air 108 channeled to combustor 102 flows in a direction generally opposite to the flow of air through engine 100. In the exemplary embodiment, gas turbine engine 100 includes a plurality of combustors 102 that are spaced circumferentially about engine casing (not shown). More specifically, in the exemplary embodiment, combustors 102 are, for example, but are not limited to being, can-annular combustors.

In the exemplary embodiment, engine 100 includes a transition duct 110 that extends between an outlet end 112 of each combustor 102 and the inlet end 114 of turbine 104 to channel combustion gases 116 into turbine 104. Further, in the exemplary embodiment, each combustor 102 includes a substantially cylindrical combustor casing 118. Combustor casing 118 is coupled to the engine casing using, for example, but not limited to using, bolts (not shown), mechanical fasteners (not shown), welding, and/or any other suitable coupling means that enables engine 100 to function as described herein. In the exemplary embodiment, a forward end 120 of combustor casing 118 is coupled to an end cover assembly 122. End cover assembly 122 includes, for example, supply tubes, manifolds, valves for channeling gaseous fuel, liquid fuel, air and/or water to the combustor, and/or any other components that enable engine 100 to function as described herein.

In the exemplary embodiment, a substantially cylindrical flow sleeve 124 is coupled within combustor casing 118 such that sleeve 124 is substantially concentrically aligned with casing 118. A combustion liner 126 is coupled substantially concentrically within flow sleeve 124. More specifically, combustion liner 126 is coupled at an aft end 128 to transition duct 110, and at a forward end 130 to a combustion liner cap assembly 132. Flow sleeve 124 is coupled at an aft end 134 to an outer wall 136 of liner 126 and coupled at a forward end 138 to combustor casing 118. Alternatively, sleeve 124 may be coupled to casing 118 and/or liner 126 using any other suitable coupling assembly that enables engine 100 to function as described herein. In the exemplary embodiment, an air passage 140 is defined between liner 126 and flow sleeve 124. Flow sleeve 124 includes a plurality of apertures 142 defined therein that enable compressed air 108 from the compressor to enter air passage 140. In the exemplary embodiment, air 108 flows in a direction that is opposite to a direction of core flow (not shown) from the compressor towards end cover assembly 122.

Combustion liner 126 includes a primary combustion zone 144, a venturi throat region 146, and a secondary combustion zone 148. More specifically, primary combustion zone 144 is upstream from secondary combustion zone 148, and primary and secondary combustion zones 144 and 148 are separated by venturi throat region 146. Venturi throat region 146 has a generally narrower diameter $D_v$ than the diameters $D_1$ and $D_2$ of respective combustion zones 144 and 148. More specifically, throat region 146 includes a converging wall 150 and a diverging wall 152 wherein converging wall 150 tapers from diameter $D_1$ to $D_v$, and diverging wall 152 widens from $D_v$ to $D_2$. As such, venturi throat region 146 functions as an aerodynamic separator or isolator to facilitate reducing flashback from secondary combustion zone 148 to primary combustion zone 144. In the exemplary embodiment, primary combustion zone 144 includes a plurality of apertures 154 defined therethrough that enable air 108 to enter primary combustion zone 144 from air passage 140.

Further, in the exemplary embodiment, combustor 102 also includes a plurality of spark plugs (not shown) and a plurality of cross-fire tubes (not shown). The spark plugs and cross-fire tubes extend through ports (not shown) defined in liner 126 within primary combustion zone 144. The spark plugs and cross-fire tubes ignite fuel and air within each combustor 102 to create combustion gases 116.

In the exemplary embodiment, at least one secondary fuel nozzle assembly 200 is coupled to end cover assembly 122. More specifically, in the exemplary embodiment, combustor 102 includes one secondary fuel nozzle assembly 200 and a plurality of primary fuel nozzle assemblies 156. More specifically, in the exemplary embodiment, primary fuel nozzle assemblies 156 are arranged in a generally circular array about a centerline 158 of combustor 102, and a centerline 202 (shown in FIG. 2) of secondary fuel nozzle assembly 200 is substantially aligned with combustor centerline 158. Alternatively, primary fuel nozzle assemblies 156 may be arranged in non-circular arrays. In an alternative embodiment, combustor 102 may include more or less than one secondary fuel nozzle assembly 200. Although, only primary and secondary fuel nozzle assemblies 156 and 200 are described herein, more or less than two types of nozzle assemblies, or any other type of fuel nozzle, may be included in combustor 102. In the exemplary embodiment, secondary nozzle assembly 200 includes a tube assembly 160 that substantially encloses a portion of secondary nozzle assembly 200 that extends through primary combustion zone 144.

Primary nozzle assemblies 156 partially extend into primary combustion zone 144, and secondary nozzle assembly 200 extends through primary combustion zone into an aft portion 162 of throat region 146. As such, fuel (not shown) injected from primary nozzle assemblies 156 is combusted substantially within primary combustion zone 144, and fuel (not shown) injected from secondary nozzle assembly 200 is combusted substantially within secondary combustion zone 148.

In the exemplary embodiment, combustor 102 is coupled to a fuel supply (not shown) for supplying fuel to combustor 102 through fuel nozzle assemblies 156 and/or 200. For example, pilot fuel (not shown) and/or main fuel (not shown) may be supplied through nozzle assemblies 156 and/or 200. In the exemplary embodiment, both pilot fuel and main fuel are supplied through both primary and secondary nozzle assemblies 156 and 200 by controlling the transfer of fuels to the nozzle assemblies 156 and 200, as described in more detail below. As used herein "pilot fuel" refers to a small amount of fuel used as a pilot flame, and "main fuel" refers to the fuel used to create the majority of combustion gas 116. Fuel may be natural gas, petroleum products, coal, biomass, and/or any other fuel, in solid, liquid, and/or gaseous form that enables engine 100 to function as described herein. By controlling fuel flows through nozzle assemblies 156 and/or 200, a flame (not shown) within combustor 102 may be adjusted to a pre-determined shape, length, and/or intensity to effect emissions and/or power output of combustor 102.

In operation, air 108 enters engine 100 through an inlet (not shown). Air 108 is compressed in the compressor and compressed air 108 is discharged from the compressor towards combustor 102. Air 108 enters combustor 102 through apertures 142 and is channeled through air passage 140 towards end cover assembly 122. Air 108 flowing through air passage 140 is forced to reverse its flow direction at a combustor inlet end 164 and is channeled into combustion zones 144 and/or 148 and/or through throat region 146. Fuel is supplied into combustor 102 through end cover assembly 122 and nozzle assemblies 156 and/or 200. Ignition is initially achieved when a control system (not shown) initiates a starting sequence of gas turbine engine 100, and the spark plugs are retracted from primary combustion zone 144 once a flame has been continuously established. At aft end 128 of liner 126, hot combustion gases 116 are channeled through transition duct 110 and turbine nozzle 106 towards turbine 104.

Figure 2:
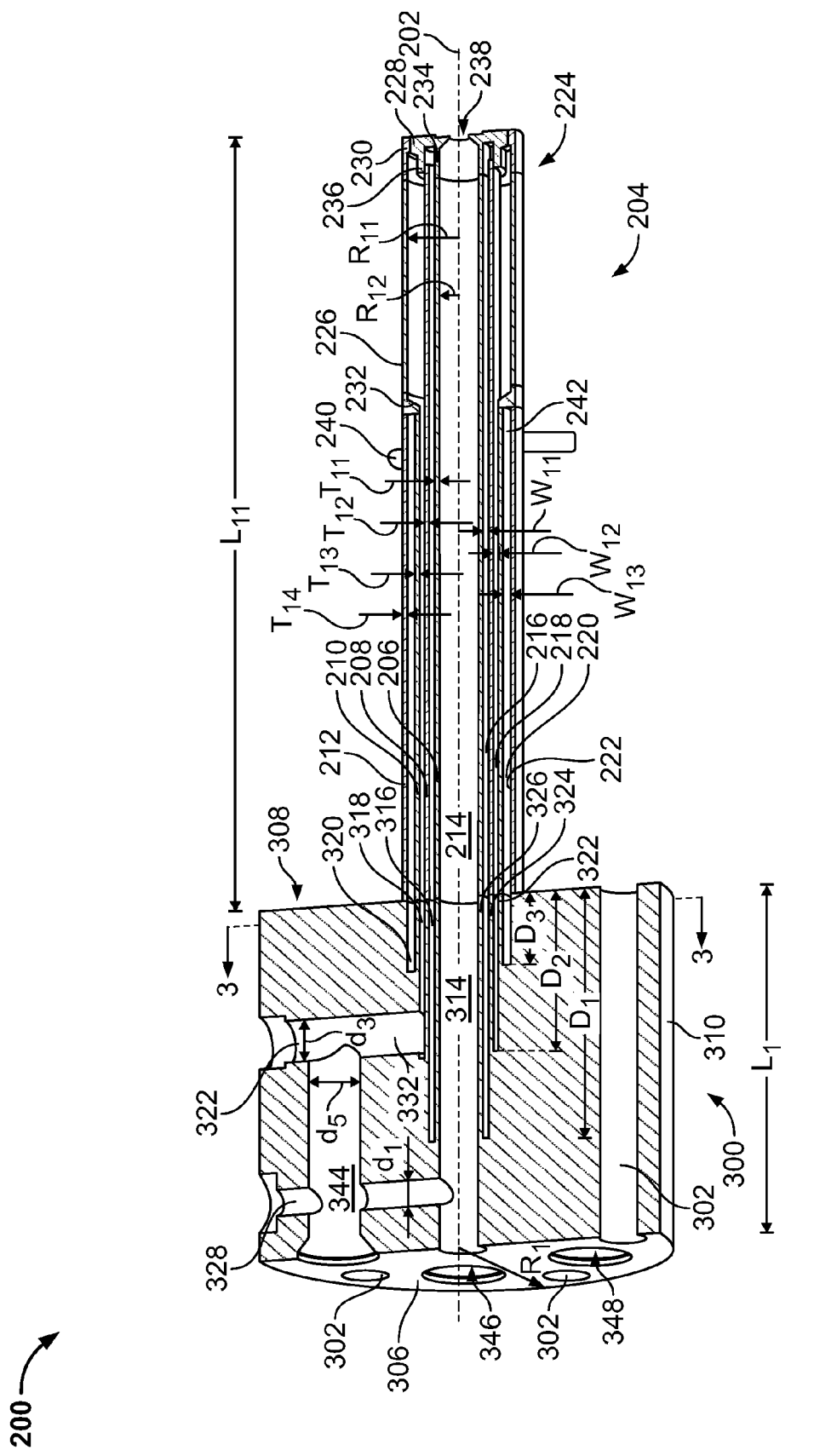
FIG. 2 is a cross-sectional view of an exemplary fuel nozzle that may be used with the combustion system shown in FIG. 1.
Figure 3:
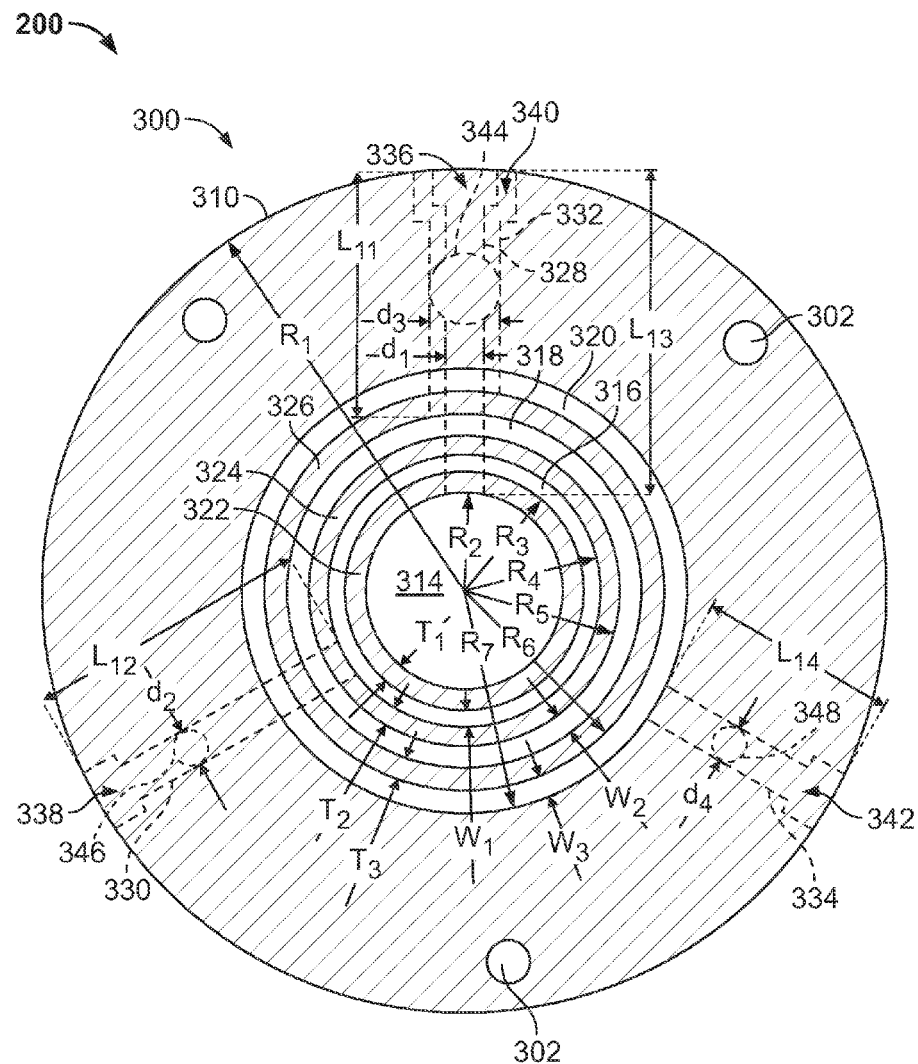
FIG. 3 is a plan view of the fuel nozzle head portion shown in FIG. 2.

FIG. 2 is a cross-sectional view of an exemplary secondary fuel nozzle assembly 200 that may be used with combustor 102 (shown in FIG. 1). FIG. 3 is an end view of a head portion 300 that may be used with secondary fuel nozzle assembly 200.

In the exemplary embodiment, fuel nozzle assembly 200 includes head portion 300 and a nozzle portion 204. Head portion 300 enables nozzle assembly 200 to be coupled within combustor 102. For example, in one embodiment, head portion 300 is coupled to end cover assembly 122 (shown in FIG. 1) and is secured thereto using a plurality of mechanical fasteners 168 (shown in FIG. 1) such that head portion 300 is external to combustor 102 and nozzle portion 204 extends through end cover assembly 122. In the exemplary embodiment, head portion 300 includes a plurality of circumferentially-spaced openings 302 that are each sized to receive a mechanical fastener therethrough. Although only three fastener openings 302 are shown in FIG. 3, for example, head portion 300 may include any number of openings 302 that enable fuel nozzle assembly 200 to be secured within combustor 102 and to function as described herein. Moreover, although an inner surface 304 of each opening 302 is illustrated as being substantially smooth, openings 302 may be threaded. In addition, although each opening 302 is illustrated as extending substantially parallel to centerline 202 of nozzle assembly 200, openings 302 may have any orientation that enables secondary fuel nozzle 200 to function as described herein. Alternatively, head portion 300 is not limited to being coupled to combustor 102 using only mechanical fasteners 168, but rather may be coupled to combustor 102 using any coupling means that enables nozzle assembly 200 to function as described herein.

In the exemplary embodiment, head portion 300 is substantially cylindrical and includes a first substantially planar end face 306, an opposite second substantially planar end face 308, and a substantially cylindrical body 310 extending therebetween. Further, in the exemplary embodiment, head portion 300 has a length $L_1$ and a radius $R_1$. Alternatively, head portion 300 may be formed with any other suitable shape that enables nozzle assembly 200 and/or combustor 102 to function as described herein. Furthermore, in the exemplary embodiment, head portion 300 is formed with only a single, continuous body 310. More specifically, head portion 300 is formed from a single, solid piece of material, as described in more detail below.

Head portion 300 includes, in the exemplary embodiment, a center passageway 314 and a plurality of concentrically aligned channels 316, 318, and 320. More specifically, center passageway 314 extends from first end face 306 to second end face 308 along centerline 202, and has a radius $R_2$. Further, in the exemplary embodiment, channels 316, 318, and 320 each extend partially from second end face 308 towards first end face 306, as described in more detail below. In the exemplary embodiment, a first channel 316 has an inner radius $R_3$, an outer radius $R_4$, and extends for a depth $D_1$ measured from second end face 308; a second channel 318 has an inner radius $R_5$, an outer radius $R_6$, and extends for a depth $D_2$ measured from second end face 308; and a third channel 320 has an inner radius $R_7$, an outer radius $R_8$, and extends for a depth $D_3$ measured from second end face 308. Because of the orientation of channels 316, 318, and 320, first channel 316 has a width $W_1$ that is approximately equal to the difference between inner radius $R_3$ and outer radius $R_4$; second channel 318 has a width $W_2$ that is approximately equal to the difference between inner radius $R_5$ and outer radius $R_6$; and third channel 320 has a width $W_3$ that is approximately equal to the difference between inner radius $R_7$ and outer radius $R_8$. In the exemplary embodiment, depth $D_3$ is deeper than depth $D_2$, and depth $D_2$ is deeper than depth $D_1$. Furthermore, in the exemplary embodiment, the radii are sized such that $R_2 < R_3 < R_4 < R_5 < R_6 < R_7 < R_8 < R_1$.

In the exemplary embodiment, a plurality of concentrically aligned channel divider walls 322, 324, and 326 in head portion 300 define channels 316, 318, and/or 320 and/or center passageway 314. More specifically, in the exemplary embodiment, center passageway 314 is defined by a first divider wall 322, first channel 316 is defined between first divider wall 322 and a second divider wall 324, second channel 318 is defined between second divider wall 324 and a third divider wall 326, and third channel 320 is defined between third divider wall 326 and body 310. First divider wall 322 has a thickness $T_1$, second divider wall 324 has a thickness $T_2$, and third divider wall 326 has a thickness $T_3$. In the exemplary embodiment, wall thicknesses $T_1$, $T_2$, and $T_3$ are approximately equal to each other. Alternatively, thicknesses $T_1$, $T_2$, and/or $T_3$ may be non-equal.

In the exemplary embodiment, head portion 300 also includes a plurality of radial inlets 328, 330, 332, and 334. A first radial inlet 328 extends through body 310 to center passageway 314, a second radial inlet 330 extends through body 310 to first channel 316, a third radial inlet 332 extends through body 310 to second channel 318, and a fourth radial inlet 334 extends through body 310 to third channel 320. As such, a length $L_{11}$ of first radial inlet 328 is approximately equal to the difference between radius $R_1$ and radius $R_8$, a length $L_{12}$ of second radial inlet 330 is approximately equal to the difference between radius $R_1$ and radius $R_6$, a length $L_{13}$ of third radial inlet 332 is approximately equal to the difference between radius $R_1$ and radius $R_4$, and a length $L_{14}$ of fourth radial inlet 334 is approximately equal to the difference between radius $R_1$ and radius $R_2$. Although in the exemplary embodiment only one radial inlet 328, 330, 332, and/or 334 is in flow communication with a channel 316, 318, and/or 320 and/or center passageway 314, alternatively each channel 316, 318, and/or 320 and/or center passageway 314 may include more than one corresponding radial inlet.

In the exemplary embodiment, each radial inlet 328, 330, 332, and 334 has a substantially constant diameter $d_1$, $d_2$, $d_3$, and $d_4$ along its respective inlet length $L_{11}$, $L_{12}$, $L_{13}$, and/or $L_{14}$. Alternatively, each radial inlet 328, 330, 332, and/or 334 may be formed with a non-circular cross-sectional shape and/or a varied diameter. More specifically, radial inlets 328, 330, 332, and/or 334 may be configured in any suitable shape and/or orientation that enables combustor 102 and/or secondary fuel nozzle assembly 200 to function as described herein.

Further, in the exemplary embodiment, first radial inlet 328 includes a first radial port 336, second radial inlet 330 includes a second radial port 338, third radial inlet 332 includes a third radial port 340, and fourth radial inlet 334 includes a fourth radial port 342. Each port 336, 338, 340, and/or 342 may be a tapered port, such as, for example, port 338, a straight port, such as, for example port 342, and/or an offset port, such as, for example, port 336 and/or 340. Alternatively, ports 336, 338, 340, and/or 342 may be configured in any suitable shape and/or orientation that enables combustor 102 and/or secondary fuel nozzle assembly 200 to function as describe herein.

Head portion 300 also includes, in the exemplary embodiment, a plurality of axial inlets 344, 346, and 348. Although only three axial inlets 344, 346, and 348 are described, head portion 300 may include any number of axial inlets that enables secondary fuel nozzle assembly 200 to function as described herein. Only axial inlet 344 will be described and shown in FIG. 3 for exemplary purposes, but it should be understood that axial inlets 346 and/or 348 have essentially similar descriptions and function similarly to axial inlet 344, as described herein. In the exemplary embodiment, axial inlet 344 extends from first end face 306, through radial inlet 328, to radial inlet 332. Although, in the exemplary embodiment, axial inlet 344 extends through radial inlet 328, axial inlet 344 may extend from first end face 306 to any radial inlet 328, 330, 332, and/or 334, with or without extending through another radial inlet 328, 330, 332, and/or 334 such that secondary fuel nozzle assembly 200 functions as described herein.

In the exemplary embodiment, axial inlet 344 has a substantially constant diameter $d_5$. Alternatively, axial inlet 344 may have a non-circular cross-sectional shape and/or a variable diameter. Moreover, in the exemplary embodiment, axial inlet 344 includes a tapered port 350. Alternatively, port 350 may have any suitable shape that enables combustor 102 and/or secondary fuel nozzle assembly 200 to function as describe herein.

In the exemplary embodiment, nozzle portion 204 is coupled to head portion 300 by, for example, welding nozzle portion 204 to head portion 300. In the exemplary embodiment, nozzle portion 204 has a length $L_{11}$ and an outer radius $R_{11}$. Although in the exemplary embodiment nozzle portion 204 is cylindrical, nozzle portion 204 may be any suitable shape that enables secondary fuel nozzle assembly 200 to function as described herein.

Nozzle portion 204, in the exemplary embodiment, includes a plurality of substantially concentrically-aligned tubes 206, 208, 210, and 212. Tubes 206, 208, 210, and 212 are oriented with respect to each other such that a plurality of substantially concentric passageways 214, 216, 218, and 220 are defined within nozzle portion 204. More specifically, in the exemplary embodiment, a center passageway 214 is defined within a first tube 206, a first passageway 216 is defined between first tube 206 and a second tube 208, a second passageway 218 is defined between second tube 208 and a third tube 210, and a third passageway 220 is defined between third tube 210 and a fourth tube 212. Although the exemplary embodiment includes four concentrically-aligned tubes 206, 208, 210, and 212, nozzle portion 204 may include any number of tubes 206, 208, 210, and 212 that enables secondary fuel nozzle assembly 200 and/or combustor 102 to function as described herein. In the exemplary embodiment, the number of tubes 206, 208, 210, and 212 is such that the number of passageways 214, 216, 218, and 220 defined by tubes 206, 208, 210, and 212 is equal to the number of head channels 316, 318, and 320 and head center passageway 314.

In the exemplary embodiment, passageways 216, 218, and/or 220 are substantially concentrically-aligned with channels 316, 318, and/or 320. Moreover, nozzle center passageway 214 is aligned substantially concentrically with head center passageway 314. As such, first tube 206 is substantially aligned with head first divider wall 322, second tube 208 is substantially aligned with head second divider wall 324, and third tube 210 is substantially aligned with head third divider wall 326. In the exemplary embodiment, fourth tube 212 is aligned such that an inner surface 222 of fourth tube 212 is substantially aligned with a radially outer surface 352 of head channel 320. Moreover, in the exemplary embodiment, first tube 206 has a thickness $T_{11}$ that is approximately equal to first divider wall thickness $T_1$, second tube 208 has a thickness $T_{12}$ that is approximately equal to second divider wall thickness $T_2$, and third tube 210 has a thickness $T_{13}$ that is approximately equal to first divider wall thickness $T_3$. As such, first nozzle passageway 216 has a width $W_{11}$ that is approximately equal to first channel width $W_1$, second nozzle passageway 218 has a width $W_{12}$ that is approximately equal to second channel width $W_2$, third nozzle passageway 220 has a width $W_{13}$ that is approximately equal to first channel width $W_3$, and nozzle center passageway 214 has a radius $R_{12}$ that is approximately equal to body center passageway radius $R_2$.

In the exemplary embodiment, nozzle portion 204 includes a tip portion 224 coupled to tubes 206, 208, 210, and/or 212. More specifically, in the exemplary embodiment, tip portion 224 is coupled to tubes 206, 208, 210, and/or 212 using, for example, a welding process. In the exemplary embodiment, tip portion 224 includes a tube extension 226, an outer tip 228, and an inner tip 230. Alternatively, tip portion 224 may have any suitable configuration that enables secondary fuel nozzle assembly 200 to function as described herein. In the exemplary embodiment, tube extension 226 is coupled to third tube 210 and fourth tube 212 using, for example, a coupling ring 232. Coupling ring 232 facilitates sealing third passageway 220 such that a fluid (not shown) flowing within third passageway 220 is not discharged through tip portion 224. Alternatively, third passageway 220 is coupled in flow communication through tip portion 224.

In the exemplary embodiment, inner tip 230 includes a first projection 234, a second projection 236, a center opening 238, and a plurality of outlet apertures (not shown). Inner tip 230 is coupled to first tube 206 and second tube 208 using first projection 234 and second projection 236, respectively. As such, in the exemplary embodiment, a fluid (not shown) flowing within center passageways 214 and/or 314 is discharged through center opening 238 and/or the outlet apertures, and a fluid (not shown) flowing within first passageway 216 is discharged through the outlet apertures. Furthermore, in the exemplary embodiment, outer tip 228 includes a plurality of outlet apertures (not shown) and is coupled to inner tip 230 and tube extension 226. As such, a fluid (not shown) flowing within second passageway 218 is discharged through the outlet apertures defined in outer tip 228 and/or inner tip 230.

In the exemplary embodiment, nozzle portion 204 also includes pegs 240 (also referred to herein as "vanes") that extend radially outwardly from fourth tube 212. Alternatively, pegs 240 may extend obliquely from nozzle portion 204. Further, although only two pegs 240 are shown in FIG. 2, nozzle portion 204 may include more or less than two pegs 240. In the exemplary embodiment, pegs 240 are positioned at a downstream end 242 of third passageway 220 proximate to coupling ring 232. Alternatively, one or more pegs 240 may be positioned at other location relative to third passageway 220. In the exemplary embodiment, pegs 240 each include a plurality of outlet apertures (not shown) such that a fluid (not shown) flowing within third passageway 220 is discharged through the peg outlet apertures.

In the exemplary embodiment, head portion 300 is formed from a single piece of material (not shown), for example, but not limited to, bar stock, a solid metal rod, and/or any other suitable unitary piece of material. Furthermore, in the exemplary embodiment, the material used to form head portion 300 is substantially cylindrical in shape, although material having other shapes may be used to fabricate head portion 300, depending on the configuration of combustor 102. More specifically, in the exemplary embodiment, the portion of material used to fabricate head portion 300 includes two substantially planar opposed faces such that head portion 300 includes first substantially planar end face 306, second substantially planar end face 308, and a substantially cylindrical body 310.

Head portion 300, in the exemplary embodiment, is fabricated using, for example, gun drilling. Alternatively, head portion 300 may be fabricated using any other suitable fabrication technique that enables secondary fuel nozzle assembly 200 to function as described herein. In the exemplary embodiment, center passageway 314 is formed through one end face 306 or 308 substantially along centerline 202 to the other end face 306 or 308. Further, in the exemplary embodiment, each of opening 302 and/or passageway 314 is fabricated from a single machining operation through body 310 from one end face 306 or 308 to the other end face 306 or 308.

In the exemplary embodiment, channels 316, 318, and/or 320 are each machined into second end face 308. As such, divider walls 322, 324, and 326 are defined in body 310 between channels 316, 318, and 320 and/or center passageway 314. It will be understood that channels 316, 318, and/or 320 may be machined into first end face 306, such that nozzle portion 204 is coupled to first end face 306 when channels 316, 318, and/or 320 are defined within first end face 306. Furthermore, in the exemplary embodiment, each inlet 328, 330, 332, 334, 344, 346, and/or 348 and respective ports 336, 338, 340, 342 and/or 350 is formed within first end face 306 and/or body 310. More specifically, each inlet 328, 330, 332, 334, 344, 346, and/or 348 and respective port 336, 338, 340, 342 and/or 350 may be formed with a single cut that extends to a channel 316, 318, and/or 320, center passageway 314 and/or to another inlet 328, 330, 332, 334, 344, 346, and/or 348. Alternatively, each inlet 328, 330, 332, 334, 344, 346, and/or 348 may be formed with one cut, and each respective port 336, 338, 340, 342 and/or 350 may be formed with a second cut. In the exemplary embodiment, the relative locations of inlets 328, 330, 332, 334, 344, 346, and/or 348 and respective ports 336, 338, 340, 342 and/or 350 are selected based on the configuration of combustor 102.

Nozzle portion 204, in the exemplary embodiment, is coupled to head portion 300 using, for example, but not limited to using, a welding process. More specifically, in the exemplary embodiment, each tube 206, 208, 210, and/or 212 is coupled to head portion 300 such that nozzle passageways 214, 216, 218, and/or 220 are substantially aligned with head channels 316, 318, and/or 320 and/or head center passageway 314, as described above. In the exemplary embodiment, tip portion 224 is welded to tubes 206, 208, 210, and/or 212 such that nozzle portion 204 is configured as described above. More specifically, in the exemplary embodiment, tube extension 226 is welded to tubes 212 and 210 using, for example, coupling ring 232, inner tip 230 is welded to second tube 208 and first tube 206 using respective projections 236 and 234, and outer tip 228 is welded to inner tip 230. Alternatively, nozzle portion 204 may be fabricated using any other suitable fabrication technique that enables secondary fuel nozzle assembly 200 to function as described herein.

In the exemplary embodiment, secondary fuel nozzle assembly 200 is coupled to combustor end cover assembly 122 using, for example, mechanical fasteners (not shown) that are inserted through fastener openings 302. Secondary fuel nozzle assembly 200 is coupled in flow communication with the fuel supply. In the exemplary embodiment, main fuel is supplied to combustor 102 through channel 320 and passageway 220, and pilot fuel is supplied to combustor 102 through channel 316 and passageway 216. Channel 318 and center passageway 314 and respective nozzle passageways 218 and 214 are configured to transition between supplying pilot fuel and main fuel to combustor 102. As such, channel 318 and center passageway 314 and respective nozzle passageways 218 and 214 may be referred to as "transfer" passages. In the exemplary embodiment, by using channel 320 and passageway 220 and the transfer passages 214, 314, 218, and 318, main fuel can be injected into combustor 102, and, more specifically, secondary combustion zone 148, through tip portion 224 and/or pegs 240. In the exemplary embodiment, the configurations of nozzle passageways 214, 216, 218, and/or 220, nozzle tip portion 224, and/or nozzle pegs 240 are selected based on predetermined pilot and/or main fuel flows. For example, a predetermined fuel flow may be obtained by machining holes (not shown) of a predetermined size through any of nozzle passageways 214, 216, 218, and/or 220, nozzle tip portion 224, and/or nozzle pegs 240.

The above-described fuel nozzle assembly and methods of fabrication produce a fuel nozzle assembly having a head portion that requires fewer components as compared to known head portion assemblies. More specifically, because the fabrication of the above-described secondary fuel nozzle assembly uses a unitary body portion, nozzle assembly fabrication is more efficient in terms of cost and time as compared to the fabrication of known fuel nozzle assemblies that include a plurality of components within the fuel nozzle head. More specifically, the unitary head portion of the present invention facilitates eliminating the plurality of seals that known head portion assemblies include. For example, the present invention facilitates eliminating a body to sleeve seal, a water lip seal, a diffusion lip seal, and a plurality of piston seals that are typically required in known head assemblies. As such, the number of potential leak areas that such seals may create are eliminated. Moreover, by reducing the number of components and welds within the fuel nozzle assembly, the unitary head portion facilitates reducing the cost of the fuel nozzle assembly, as compared to fuel nozzle assemblies that include a plurality of components.

Further, the above-described fuel nozzle assembly and methods of fabrication facilitate improving the reliability of the fuel nozzle assembly by reducing the number of components within the head portion. More specifically, because the unitary head portion of the present invention includes only one component, i.e., the head portion itself, the fuel nozzle assembly includes fewer components that may wear during use as compared to known fuel nozzle assemblies that include multi-component head portions. Furthermore, the above-described fuel nozzle assembly may be fabricated in any suitable configuration based on the combustor. More specifically, the inlets, ports, passageways, and/or channels defined within the head portion may be fabricated in any orientation and/or position based on the combustor configuration. As such, the fuel nozzle assembly of the present invention enables retrofitting fuel nozzles into combustors as compared to fuel nozzle assemblies that include multi-component head portion assemblies.

Additionally, the above-described secondary fuel nozzles may be used to control and manipulate multiple fuel flow paths to facilitate controlling emissions, flame shape, dynamics, and/or other combustion characteristics. The multiple passageways through the nozzle enable independent flow control of fuel for multiple pathways and/or for multiple combustor power, emissions, and/or control cycles. Such independent flow control facilitates providing more control of fuel distribution as compared to fuel nozzles that do not includes multiple, independently-controlable fuel flow passageways.

Exemplary embodiments of a fuel nozzle assembly for use with a gas turbine are described above in detail. The fuel nozzle assembly is not limited to the specific embodiments described herein, but rather, components of the fuel nozzle assembly may be utilized independently and separately from other components described herein. For example, the head portion may also be used in combination with other combustion systems and fuel nozzle assemblies, and is not limited to practice with only the combustion system as described herein. Rather, the present invention can be implemented and utilized in connection with many other fuel combustion applications.

While the invention has been described in terms of various specific embodiments, those skilled in the art will recognize that the invention can be practiced with modification within the spirit and scope of the claims.

What is claimed is:

1. A secondary fuel nozzle assembly comprising:
a nozzle portion comprising a central passageway and a plurality of passageways that are each concentrically-aligned with said central passageway; and
a unitary head portion comprising a first end face, a second end face, and a substantially cylindrical body extending therebetween, said first and second end faces are substantially planar, said nozzle portion is coupled to said first end face and extends outward therefrom, said head portion comprising a plurality of inlets, wherein each of said plurality of inlets is in flow communication with at least one of said plurality of nozzle passageways, said plurality of inlets comprising:
a plurality of radial inlets oriented substantially perpendicularly to a centerline extending through said head portion, wherein at least one of said radial inlets comprises a radial port portion and a tubular portion extending radially inward from said port portion, said port portion having a diameter that is larger than a diameter of said tubular portion; and
a plurality of axial inlets extending into said head portion from said second end face and oriented substantially parallel to the head portion centerline, a first of said plurality of axial inlets is coupled in flow communication with one of said plurality of radial inlets, and a second of said axial inlets is coupled in flow communication with more than one of said plurality of radial inlets.

2. A secondary fuel nozzle assembly in accordance with claim 1 wherein said nozzle portion further comprises at least one peg extending outward therefrom.

3. A secondary fuel nozzle assembly in accordance with claim 1 wherein said at least one of said plurality of axial inlets comprises a tapered inlet port.

4. A secondary fuel nozzle assembly in accordance with claim 1 said unitary head portion further comprises a plurality of channels defined within said first end face, said plurality of channels are substantially concentrically aligned with respect to each other.

5. A secondary fuel nozzle assembly in accordance with claim 4 wherein each of said plurality of channels is substantially concentrically-aligned with one of said plurality of nozzle portion passageways.

6. A secondary fuel nozzle assembly in accordance with claim 4 wherein each of said plurality of channels is in flow communication with at least one of said plurality of head inlets.

7. A secondary fuel nozzle assembly in accordance with claim 4 wherein said head portion further comprises a center passageway extending from said first end face to said second end face, said center passageway is substantially concentrically-aligned with respect to said plurality of channels.

8. A combustor assembly for use with a gas turbine engine, said combustor assembly comprising:
   a combustion zone;
   a primary fuel nozzle assembly coupled within said combustion zone; and
   a secondary fuel nozzle assembly coupled within said combustion zone, said secondary fuel nozzle assembly comprising:
      a nozzle portion comprising a central passageway and a plurality of passageways that are substantially concentrically-aligned with said central passageway; and
      a unitary head portion comprising a first end face, a second end face, and a substantially cylindrical body extending therebetween, said first and second end faces are substantially planar, said nozzle portion is coupled to said first end face and extends outward therefrom, said head portion comprising a plurality of inlets, wherein each of said plurality inlets is in flow communication with at least one of said plurality of nozzle passageways, said plurality of inlets comprising:
         a plurality of radial inlets oriented substantially perpendicularly to a centerline extending through said head portion, wherein at least one of said plurality of radial inlets comprises a radial port portion and a tubular portion extending radially inward from said port portion, said port portion having a diameter that is larger than a diameter of said tubular portion; and
         a plurality of axial inlets extending into said head portion from said second end face and oriented substantially parallel to the head portion centerline, a first of said plurality of axial inlets is coupled in flow communication with one of said plurality of radial inlets, and a second of said axial inlets is coupled in flow communication with more than one of said plurality of radial inlets.

9. A combustor assembly in accordance with claim 8 wherein an outlet of said secondary fuel nozzle assembly is downstream from an outlet of said primary fuel nozzle assembly.

10. A combustor assembly in accordance with claim 8 further comprising a plurality of said primary fuel nozzle assemblies.

11. A combustor assembly in accordance with claim 8 wherein said secondary fuel nozzle assembly nozzle portion is configured to inject a predetermined amount of pilot fuel through a first of said plurality of passageways and inject a predetermined amount of main fuel through a second of said plurality of passageways, wherein each of said plurality of passageways is configured to be controlled independently of any other of said plurality of passageways.

12. A combustor assembly in accordance with claim 8 wherein said head portion of said secondary fuel nozzle assembly further comprises a plurality of channels defined within said head portion first end face, said plurality of channels are substantially concentrically aligned with respect to each other.

13. A combustor assembly in accordance with claim 12 wherein each of said plurality of channels is substantially concentrically-aligned with one of said plurality of nozzle portion passageways.

14. A combustor assembly in accordance with claim 12 wherein each of said plurality of channels is in flow communication with at least one of said plurality of head portion inlets.

* * * * *